F. T. SCHRANCK.
PLUME.
APPLICATION FILED AUG. 25, 1909.
984,973.
Patented Feb. 21, 1911.
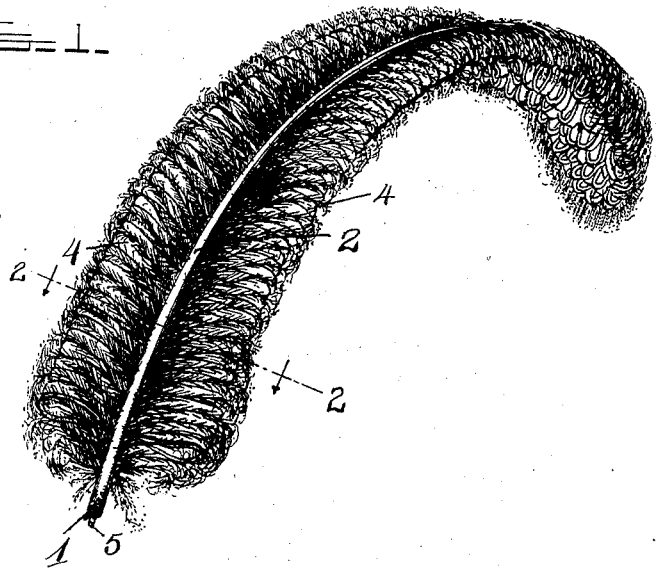
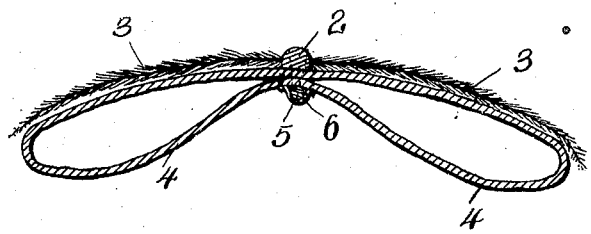
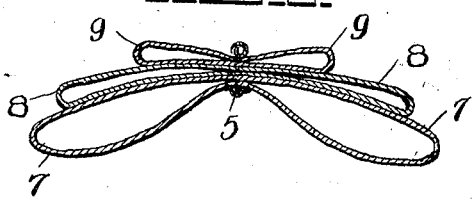
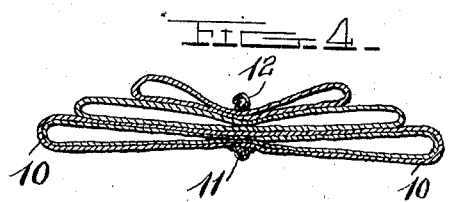
Witnesses
E. C. Crooker
C. H. Griesbauer
Inventor
F. T. Schranck.
by H. B. Willson & Co.
Attorneys
THE NORRIS PETERS CO., WASHINGTON, D. C.

UNITED STATES PATENT OFFICE.

FANNY T. SCHRANCK, OF WILMINGTON, DELAWARE.

PLUME.

984,973.

Specification of Letters Patent. Patented Feb. 21, 1911.

Application filed August 25, 1909. Serial No. 514,621.

*To all whom it may concern:*

Be it known that I, FANNY T. SCHRANCK, a citizen of the United States, residing at Wilmington, in the county of Newcastle and State of Delaware, have invented certain new and useful Improvements in Plumes; and I do declare the following to be a full, clear, and exact description of the invention, such as will enable others skilled in the art to which it appertains to make and use the same.

My invention relates to feathers and more particularly to artificial plumes for use upon ladies' and misses' hats.

The object of the invention is the production of a plume which will closely resemble the fine ostrich plumes and which can be manufactured at an absurdly small cost when compared with the cost of ostrich plumes as they are sold upon the market to-day.

Another object of the invention is to supplement the beauty of the poorer class of ostrich plumes by building them up so to speak by artificial means which comprises a portion of this invention and which will hereinafter be more fully described.

A still further object of the invention is the production of an artificial plume that is constructed of a plurality of shades of ribbon having layers of different widths or of the same width.

Heretofore, there has been no adequate way in which to increase the selling value of poor ostrich plumes. In other words, the barbs or rami of the feathers were thin and scarce and the feather had to be sold at a price much under that which the feather would have brought were it supplied previously with barbs.

It is the object of my invention to so treat this type of feathers that they may be placed upon the market and sold at a price much in advance of what they would bring without the treatment given them.

With these and other objects in view, the invention consists of certain novel features of construction, combination and arrangements of parts as will be more fully described and pointed out in the appended claims.

In the drawings, Figure 1 is a perspective view showing my invention applied to a plume to reinforce the same; Fig. 2 is a sectional view taken transversely through the plume; Fig. 3 is a fragmentary perspective view of a modified form of plume; Fig. 4 is a similar view of a still further modification.

Referring more especially to the drawings, 1 represents the quill or calamus of the feather and 2 the shaft or rachis. In feathers of this type the barbs or rami 3, are not connected together as in other feathers and are curled. Where these barbs are scant, it is necessary to reinforce or build them up in order to sell these feathers at a reasonable price. I therefore bring my invention into play by applying to scanty plumes the artificial plume which I have devised. This consists of a series of loops 4, of ribbon connected together and bound upon a malleable wire 5. A suitable strip of material such as moire or the like is adapted to cover the wire 5 and the whole is sewed to the underneath side of the rachis. Preferably, the loops 4, extend slightly beyond the rami or barbs of the ostrich plume so as to be exposed and they are preferably of the same color as the feather although they may be different. Any suitable material or ribbon may be used for the purpose of forming the artificial plume. These loops are preferably formed by winding them over and over on a paste-board strip of the desired width, then connecting the separate folds or loops together in their middle so as to form individual loops on opposite sides of the wire 5, slightly bending the pasteboard so as to remove it from the series of loops and finally sewing the wire down the center parallel with the connecting stitching. The device is then secured to the rachis of the feather as is shown in Fig. 2.

In Fig. 3, I have shown a series of connected loops 7, made in the manner just described and separate series of loops 8 and 9 are of gradually decreasing width and are preferably of a color different from that of the loops 7, although they may be of the same color as will be readily understood. Any number of sets of loops may be connected together and bound upon a wire stem which acts as a substitute for the shaft of the real feather.

In Fig. 4 the underneath loops 10, are shown as being reinforced with a stiffening therewith such as crinoline, buckram or the like. A plurality of series of loops are connected upon the top of one another, being graduated in size similar to the device shown in Fig. 3 and are bound upon a wire 11. In this instance, the wire is covered with a strip of moire or the like such as is shown in Figs. 1 and 2, and the rachis of the feather represented at 12 by a strip of twisted ribbon connected to the top series of loops by invisible stitching. Any of these loops may be constructed of any suitable material but the under-loop is preferably made of relatively heavy taffeta or the like in order that the bottom series of loops will hold their form and in a way support the top series of loops, which may be formed of lighter material which if unsupported, would become disarranged and make the appearance of the feather shabby in a very short time.

I am aware that it has heretofore been proposed to superpose natural feathers, one upon another, in order to improve the appearance of the same, and I make no claim to such a construction. I am also aware that it has heretofore been proposed to make artificial plumes by attaching strands of worsted or similar material to a central stem, but I make no claim to such a device. In these prior artificial plumes, the worsted loops were incapable of forming a firm support for a large feather and were intended only as substitutes for a feather. My device provides a practically continuous support for a large feather, which will permit the feather to assume its natural shape and will tend to improve the appearance of the feather by providing a base or form over which the edges of the feather may curl. The ribbon loops employed by me will serve to hold the feather away from the hat to which it is applied, and will possess sufficient elasticity to permit the feather to adjust itself to various angles and to follow the movements of the hat on the head of the wearer without liability of the feather being broken or separated from its support.

Having thus described my invention, what I claim is:

A plume comprising a central flexible stem, a plurality of ribbon loops secured transversely to and projecting laterally beyond the stem with their edges in juxtaposition whereby a continuous support is provided, and a feather having its rachis secured upon said flexible stem and its rami resting upon said loops.

In testimony whereof I have hereunto set my hand in presence of two subscribing witnesses.

FANNY T. SCHRANCK.

Witnesses:
LILLIE C. ROXBURG,
ELSIE K. THOMPSON.